3,223,654
EPOXY RESIN FOAMS AND METHOD
OF MAKING SAME
Mortimer H. Nickerson, Winchester, and Herbert S. Schnitzer, Springfield, Mass., and John Eliot Curtis and George D. Patterson, Thompsonville, Conn., assignors, by mesne assignments, to DeBell & Richardson, Inc., Hazardville, Conn., a corporation of Connecticut
No Drawing. Filed June 19, 1959, Ser. No. 821,346
13 Claims. (Cl. 260—2.5)

This invention relates to compositions, and methods and procedures for making low density cellular plastic materials, more particularly for the making of thermoset foams from epoxy resins.

This application is a continuation in part of application Serial No. 642,382, filed February 26, 1957, now abandoned.

The epoxy resins referred to may be generally defined as the reaction product of Bisphenol A with epichlorohydrin. By varying the proportions of these two reactants products may be obtained which vary in viscosity, molecular weight, and the number of residual epoxy groups. Variations may also be made in the product by chemical modification of the Bisphenol A.

A typical epoxy resin useful in the present invention is a liquid having the chemical structure:

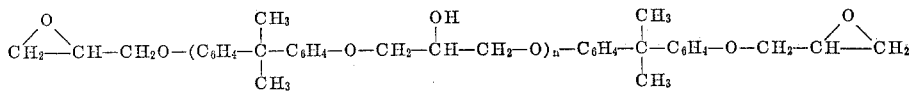

wherein $n$ may be zero or any integer greater than 0, and the term "epoxy resin" as used hereinafter has reference to a resin of the above structure. These epoxy resins are used for various purposes and in view of the well published information on these resins further detailed discussion of them is unnecessary and the above is believed adequate for the purpose of defining the general type of resinous material which is more particularly involved in the present invention. These epoxy resins are available commercially in various types under the name Epon and under various other trade designations. To secure the maximum advantages of the invention the resins which are relatively low in molecular weight and viscosity and high in epoxy reactivity; as, for example, Epon 864, Epon 834 or Epon 828 have been found preferable. Epon 864 has an epoxide equivalent weight of 300–375, Epon 834 has an epoxide equivalent weight of 225–290 and Epon 828 has an epoxide equivalent weight of 175–210, epoxide equivalent weight being the weight in grams which contains 1 gram equivalent of epoxide.

Lightweight plastic foams find many uses for both heat and sound insulation, as well as for void fillers in stressed skin structures where they serve principally as spacers between the load bearing surfaces. For these purposes, maximum strength with lightweight is desired, as well as, and importantly, uniform and dependable insulation characteristics, which with strength characteristics are dependent on the size and uniformity of the cellular structure. Further desired characteristics are the ability to stand heat on the order of 300° F. without deformation or collapse of the foam structure and the ability to withstand organic solvents such as styrene monomer. These last two requirements can only be met satisfactorily with a thermoset foam.

Proposals and procedures have been described in the published literature and elsewhere for making foam from epoxy resins. These prior proposals and procedures consist of making a mixture at elevated temperatures, of epoxy resin, amine curing agent and blowing agent and heating the mixture in a suitable cavity so that the blowing agent decomposes thermally with the evolution of gas and the epoxy resin cures to its thermoset condition under the influence of the curing agent. The use of a surface-active agent to give finer structured foams, and of solvents to modify the viscosity, has also been suggested.

The procedure above described gives an irregular foam, useful for some purposes, but one which lacks the structural uniformity, that is, uniform cell size and shape and uniform density, and does not afford control over these and other quality characteristics which the industry needs and which is desirable in most uses and essential in many important uses where blocks of one cubic foot, and larger, are required. The epoxy resins have many recognized advantages as a foam material but the efforts to overcome the above-mentioned deficiencies of epoxy foams made by presently known procedures have not proved successful.

It is the principal object of the present invention to overcome the deficiencies and difficulties above pointed out and provide a method for making epoxy foams of maximum strength, of high quality and of uniform and predetermined density in a range of 2 lbs. per cubic foot to 40 lbs. per cubic foot.

Other objects and advantages residing in the compositions employed will be made apparent in the following specification and claims.

As above pointed out the standard practice in making epoxy resin foams has been to mix the resin with amine curing agent and a blowing agent at elevated temperatures below the thermal decomposition temperatures of the blowing agent, filling a suitable mold cavity with the mixture and heating the mixture so that the blowing agent decomposes with the evolution of gas, the resin curing to its thermoset condition under the influence of the curing agent. Ethylene diamine, primary or secondary aliphatic polyamines, more particularly polyethylene amines such as diethylene triamine (DET), and triethylene tetramine (TET), are generally described as good curing agents for the resin and have been more commonly used than the primary or secondary aromatic polyamines such as p,p'-methylene dianiline (MDA) and metaphenylene diamine (MPD). Used with epoxy resins, however, DET and other aliphatic polyamines produce thermoset products having a lower heat distortion point than the more expensive and less frequently used MDA or MPD. Furthermore, DET appears in some instances to cause an earlier gel point than MDA or MPD. As the liquid resin advances toward the solid, under the influence of the curing agent, the mass does not increase gradually and uniformly in viscosity but, with DET, rather soon develops a gel-like character which is difficult or impossible to pour smoothly into the cavity in which the foaming and curing is to take place. Such viscosity characteristics are extremely important in a foaming operation which it has been found must be nicely timed.

An essential feature of the method of the invention is a dual curing system which effects the cure of the resin and at the same time modifies the action of the blowing agent employed, as later more fully explained, to secure a uniform and controlled rate of decomposition of the blowing agent, and provide control of the heat evolution during foaming and curing to produce the novel uniform, isotropic foam structure of predetermined density above described.

A variety of blowing agents have been suggested for use in making epoxy foams by prior methods such as carbonates and bicarbonates and synthetic blowing agents such as Celogen (p,p'-oxybis-(benzenesulfonyl hydrazide)) or Unicel (diazoaminobenzene), the latter two decomposing to release nitrogen.

We have found that certain considerations heretofore overlooked, or disregarded, are important in the selection, treatment and handling of the blowing agent. We have found that for maximum strength it is important that the blowing agent used should be one generating the most gas from the least material with a minimum amount of residual products and that ammonium bicarbonate which has been finely ground to pass through at least 100 mesh, and preferably 200 mesh screen (U.S. Standard Sieve No. 200), but not finer than 350 mesh screen (U.S. Standard Sieve No. 350), best meets the requirements above indicated. Ammonium carbonate under the same limitations has been found to be the next best blowing material and gives acceptable results. Since the bicarbonate is dispersed and not dissolved in the resinous mass, each grain of blowing agent creates a cell in the final foam, thus giving it a fine, unicellular structure. Coarse and non-uniform granulation produces coarse and non-uniform foams. On the other hand, too fine a granulation results in an excessive decomposition rate producing such a rapid expansion that cell walls are physically ruptured and a poor foam structure results.

The volatilization and decomposition temperature of ammonium bicarbonate to ammonia and $CO_2$ (plus water) is commonly given as 36° C. to 60° C., but actually ammonium bicarbonate when dispersed alone in epoxy resin decomposes only sluggishly and non-uniformly at these or even higher temperatures. We have found, quite unexpectedly, that the rate of decomposition of ammonium bicarbonate, when dispersed in the epoxy resin is greatly affected by the presence of small amounts of diethylene triamine which is a curing agent for epoxy resins. We have found that in the presence of small amounts of diethylene triamine, the decomposition proceeds, with moderate rapidity and uniformity. This effect is not observed with p,p'-methylene dianiline or metaphenylene diamine. This phenomenon enables the use of the more desirable MDA or MPD as the "prime" curing agent and the use of diethylene triamine as a "secondary" curing agent to "trigger" and control the rate of the foaming reaction as desired.

It has further been found that the best and most uniform foams are produced when the resinous mass at the actual time of foaming has been partially advanced to a more viscous condition. Further, the amount of heat liberated when an epoxy resin is completely cured by interaction with a curing agent is so great that in casting large foam masses, if all of this heat were liberated at once, the interior of the foam would become greatly overheated with a resultant bad effect on the foam structure.

Both of these objectives, advancement of the resin and removal of some heat under controlled conditions prior to foaming, can be achieved by heating the resin initially in a stirred, jacketed vessel with the addition of a small amount of curing agent far below that required for complete cure of the resin. In doing this, it is preferable to use diethylene triamine, since in small amounts it gives a little of the gel-like character referred to above, and which in small amounts is beneficial to the structure. In the stirred and jacketed vessel with diethylene triamine, part of the exothermic reaction takes place and heat can be removed by cooling in the jacket. When the final foaming and curing takes place in the mold, the exothermic heat is therefore reduced by this amount, and the foam structure in the center is not disturbed.

The last requirement is that of a closed mold of sufficient strength to restrain the foaming mixture at a smaller volume than would be obtained if the mix were foamed unrestrained in an open vessel. It is, of course, obvious that by employing weighed amounts of resin and fixed volume molds one will then obtain foams of controlled density. What is not obvious, however, is that only by restraining the foaming mass is one assured of great uniformity of density and structure within the finished foam block. It has consistently been observed that formulations which give excellent foams in a closed container give poor foam structure in open containers. The reasons for this are apparent only after careful study of the foaming mechanism.

At the time of foaming, gas is being evolved and also the resinous mass is converting from a liquid to a solid. On first setting to a solid, the solid resin is still only partially cured and consequently rather weak. If not supported or restrained at this point, further expansion resulting from internal gas pressure will rupture and tear the resinous cell walls causing cracks, flaws, blow holes, and other non-uniformities in the foam structure. This can be avoided by using a mold which can be tightly closed after the original air phase above the foaming mass has been displaced. In conjunction with the use of such a mold, sufficient foaming agent should be used so that the foaming mass rather quickly expands to fill the cavity before the resinous phase has reached the gel or tender stage. If these two conditions apply, thereafter the gas pressure acts as a stabilizing influence on the non-expanding foam. It has been found that internal pressure generated within the closed mold should be controlled, by adjustment of the amount of blowing agent, to 5–50 p.s.i. In general, the higher the pressure within this range, the finer structured and more uniform is the final foam product. Also, in general the lower the density of the foam which is being produced the greater the need for internal pressure to produce a uniform foam.

As illustrative of the application of the above principle, we present herewith the procedure and formulation used in foaming a block of foam into a density of 4.5 lbs./cu. ft. The mold used in this case had a capacity of 0.125 cubic foot and was constructed of six pieces of ¼ inch thick aluminum sheet stock assembled to form a cubical box measuring 6 inches inside and bolted together to withstand the internal pressure developed. The box was assembled except for the top which was mechanically arranged so that it could be bolted in place after the foam had been introduced into the mold. In order to permit ready release of the finished foam block from the metal surfaces, the interior of the foam cavity was lined with cellophane.

Three hundred grams of epoxy resin Epon 834 were heated in a stainless steel container with agitation to a uniform temperature of 75° C. At this point 3 grams of diethylene triamine was added, and stirring continued. The temperature of the mixture almost immediately began to climb and was allowed to peak at 110° C., after which it was allowed to cool to a temperature of 85° C. At this point a paste made up by dispersing 10 grams of finely ground ammonium bicarbonate in 10 grams of the monolaurate ester of diethylene glycol (Diglycol Laurate S) was added to the mixture and stirring continued until well dispersed in the epoxy resin. The ammonium bicarbonate had been ground and sifted to pass 200 mesh but not finer than material which would go through 350 mesh. As soon as the ammonium bicarbonate paste had been well dispersed in the epoxy resin, 55.8 grams of p,p'-methylene dianiline (molten at a temperature of 100° C.) was added and stirred in. At this point the final curing action of the epoxy resin begins and proceeds moderately slowly so that the temperature of the reaction will rise. Some external heat is used to bring the temperature to 95° C. in about 10–15 minutes. At this point a final addition of 1.8 grams of diethylene triamine is added. Stirring is continued at this point only long enough to make sure that this last addition of curing agent has been thoroughly mixed in. On the addition of this last amount of diethylene triamine, the temperature will begin to climb very rapidly and the ammonium bicarbonate will very shortly begin to decompose to cause foaming. The mixture as described above is poured promptly into the above described mold which has been preheated to a temperature of 100° C. The top of the mold is placed loosely in position and within a few minutes the resinous mass has foamed to the top of the mold displacing all the air ahead of it. As soon as all of this air has been displaced as evidenced by leakage of foaming mass around the loosely placed top, the top is tightly secured down to prevent further leakage.

The exterior surfaces of the mold are maintained at a temperature of 100° C. for a period of about 1 hour, although the exothermic heat generated by the foaming and curing action may drive the interior temperature of the block as high as 125° C. or higher. At the end of 1 hour the external heat is turned off and then the block allowed to cool to room temperature after which the walls may be disassembled and one obtains a remarkably uniform 6-inch cube of epoxy foam in which the cell size is small, on the order of $\frac{1}{16}$ inch, and there are no large blow holes, cracks or fissures.

In calculating the amount of blowing agent, ammonium bicarbonate, to be used in filling any cavity, certain assumptions are made for convenience. It is assumed that one mol of ammonium bicarbonate will liberate one mol of $CO_2$, and one mol of $NH_3$, and that for calculating purposes one mol of gas will occupy a volume of 22.4 liters. The amount of ammonium bicarbonate used is adjusted so that the volume of gas produced by the above calculation is at least 50% greater than the cavity to be filled with foam. Inasmuch as there will also be water present as steam, and since the reaction temperature is in excess of 100° C. at the time of foaming, and since the volume of 22.4 liters is occupied by one mol of gas under standard conditions (lower temperature), this insures that there is an adequate amount of blowing agent which will evolve enough gas to positively insure complete expansion of the foaming mass in a short period of time with enough additional gas left over to maintain a positive pressure within the mold.

Although in the example shown p,p'-methylene dianiline has been used as the prime curing agent, metaphenylene diamine may also be used or mixtures of the two may be used. Where metaphenylene diamine is used, it replaces the p,p'methylene dianiline on a mol-for-mol basis. Whether one or the other, or the two in combination, is used, it is always added to the foaming mixture in liquid form above its melting point.

It is well known in the art to use a surface active agent to improve the uniformity of pore size. For the purposes of the described procedure, Diglycol Laurate S (monolaurate ester of diethylene glycol) has been found to behave in an excellent manner when used in this respect, but it is recognized that other surface active agents may work equally well, and the use of any other such agent is not precluded.

Based on theoretical calculations, approximately 10 parts of diethylene triamine are required for 100 parts of Epon 834 to fully cure the resin. It will be seen, therefore, that the initial addition of diethylene triamine in order to advance the resin and remove some of the exothermic heat is approximately 10% of that required for the theoretical cure, and this amount is about optimum, although it can be varied within certain limits depending upon the size of the batch that is being handled. It is permissible to go as high as 25% of theoretical for the initial addition of diethylene triamine or the amount may be reduced to as little as 5% of the theoretical amount.

Again on the theoretical basis approximately 22 parts of p,p'-methylene dianiline are required to cure 100 parts of Epon 834. It may be readily calculated from the above formulation that 80% of the theoretical amount of aromatic amine curing agent required to cure the resin has been used. The amount used may be varied from 50% to 95% of theoretical requirements. The small amount of the diethylene triamine added just before pouring is primarily to trigger the decomposition of the ammonium bicarbonate and is in itself far insufficient to cause cure of the epoxy resin. It amounts to from 2% to 6% of the theoretical requirements to completely cure. Taken together with the other curing agents which have previously been added, the amounts selected within the above percentage ranges are such that the total amount of curing agent used is between 95% and 110% of the theoretical requirement for epoxy resin in the example given, but may be reduced to as little as 60% of theory.

The theoretical amine requirement for cross-linking epoxy resins of the type here used is based on the reaction of one amine hydrogen atom with one resin epoxide group. Thus the theoretical amine requirement will vary with the amine curing agent chosen, and can be calculated from the epoxide equivalent of the resin, the molecular weight of the amine, and the number of amine hydrogen atoms per amine molecule.

As a further illustration of how these principles may be applied to the formation of a large block of epoxy resin foam, the following procedure was used to make a block measuring 6' x 2' x 1' (12 cubic feet) to a density of 13 lbs./cu. ft. The mold in this case was of massive construction with the long sides being constructed of heavy steel channel iron and the top and bottom plates reinforced with steel grating and channel iron. For convenience in construction of the mold to make it tightly sealed, the interior of the mold was lined with ¾-inch plywood covered with cellophane, which also assisted greatly in disassembling the mold and removing the supporting forms from the foam block.

Seventy-three kilograms of Epon 834 was charged to a 30-gallon stirred and jacketed mixing vessel and brought to a temperature of 75° C., at which point 1095 grams of diethylene triamine was added. This caused an exothermic reaction which was controlled by cooling water in the jacket so that the reaction peaked at 100° C. and then was brought down to 92° C. over a period of 40 minutes. At this point there was added a paste composed of 1095 grams of ammonium bicarbonate dispersed in 1250 grams of Diglycol Laurate S. The ammonium bicarbonate had been ground and sifted to pass through 200 mesh but retained on 350 mesh. After this paste of ammonium bicarbonate had been well dispersed in the resinous mass, 8320 grams of p.p'-methylene dianiline (molten and at a temperature of 85° C.) was added, after which addition the temperature began to rise slowly. When the temperature reached 95° C., 219 grams of diethylene triamine was added and allowed to stir in for 2–3 minutes. The temperature began to rise fairly rapidly and at 100° C. the first evidence of foaming began and the mixture was poured promptly into the mold, which had been preheated to 100° C.

The top was placed loosely on the mold and within 10 minutes all of the air had been displaced and a small amount of leakage began to develop as the foam pushed its way out. At this point the top of the mold was securely bolted down tight and further leakage was prevented. Heat was turned off in the mold and the exothermic reaction allowed to maintain temperature. Thermocouple measurements indicated a temperature of 280° F. was reached on the inside face of the mold in about 10 minutes.

Approximately one hour after making the pour and sealing the mold, heat was again turned on the exterior mold surfaces to bring them to a temperature of 100° C., and this temperature was maintained for the next 7 hours while the block was curing. At the end of this time the heat was turned off and the block allowed to cool slowly over the next 12 or so hours. In such a massive structure where the material itself is a good heat insulator, care must be taken to avoid sudden cooling which will produce thermal stresses within the block.

Approximately 20 hours after making the pour, the mold may be disassembled and the block removed and on examination by cross-sectioning it will be found that it consists of a fine, uniform pore-size, uniform-density structure.

Epoxy resins when cured in the absence of fillers and with the usual amine catalysts are, like most organic materials, combustible. It has been found, however, that the incorporation of halogenated material together with antimony trioxide can render the resulting foams noncombustible in the sense that after having been ignited by the application of flame, they will fairly promptly extinguish themselves once the exterior flame has been removed. The example formulation is modified to the extent that 20 parts of chlorinated napthalene or chlorinated diphenyl and 10 parts of finely ground antimony trioxide are added to each 100 parts of the Epon 834. After making this mix, the epoxy resin could then be foamed according to the formulations and procedures described above to produce uniform density and uniform structured foams.

The ability of epoxy resins to take inert fillers is well known and their use in foaming compositions as herein described is not precluded. Such filler may be pigments for purposes of coloring the foam.

What is claimed is:

1. Method of producing a rigid thermoset foam essentially isotropic from a resin having at least two

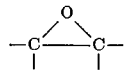

groups per molecule which comprises exothermally reacting a mixture of said resin and a curing agent to partially cure said resin, dispersing a finely divided decomposable blowing agent in said mixture with the reaction temperature below the active decomposition temperature of said blowing agent, with said blowing agent present in the mixture, thereafter conducting the reaction below said decomposition temperature, said blowing agent being the sole blowing agent present in the mixture, and thereafter, with the reaction below said decomposition temperature, triggering a rapid decomposition of the blowing agent by the addition of a material selected from the group consisting of the primary and secondary aliphatic polyamines, and immediately confining the mixture whereby the cure of the resin is completed and the active foaming reaction takes place under an internally generated pressure.

2. Method of producing a rigid thermoset foam essentially isotropic from a resin having at least two

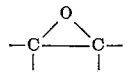

groups per molecule which comprises exothermally reacting a mixture of the resin and a curing agent to partially cure said resin, dispersing a finely divided decomposable blowing agent in said mixture with the reaction temperature below the active decomposition temperature of said blowing agent, said blowing agent being selected from the group consisting of ammonium bicarbonate and ammonium carbonate, said blowing agent being the sole blowing agent present, with said blowing agent present in the mixture, thereafter conducting the reaction below said decomposition temperature, and thereafter with the reaction proceeding below said decomposition temperature triggering a rapid decomposition of the blowing agent by the addition of a material selected from the group consisting of primary and secondary aliphatic ployamines in an amount from 2% to 6% of that theoretically required for complete cure of resin, and thereafter immediately confining the mixture whereby the cure of the resin is completed and the active foaming reaction takes place under internally generated pressure.

3. Method of producing a rigid thermoset foam essentially isotropic from a resin having at least two

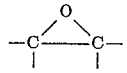

groups per molecule which comprises; exothermally reacting a mixture of said resin and a curing agent, dispersing a finely divided blowing agent in the mixture with the reaction temperature below the active decomposition temperature of said blowing agent, said blowing agent being selected from the group consisting of ammonium bicarbonate, ammonium carbonate and mixtures of ammonium bicarbonate and ammonium carbonate, said blowing agent being the sole blowing agent present, with said blowing agent present in the mixture, thereafter conducting the reaction below said active decomposition temperature, and thereafter with the reaction below said decomposition temperature, triggering the exothermally reacting mixture, with the latter at a temperature of approximately 95° C. and prior to substantial thermal decomposition of the blowing agent by adding a quantity of polyethylene amine, in an amount from 2% to 6% of that theoretically required for complete cure of the resin, and immediately pouring the mixture into a mold and closing the mold, whereby the exothermic curing and foaming reaction is completed in the mold in the absence of air and under an internally generated pressure of 5 to 50 p.s.i., the quantity of polyethylene amine selected within the above percentage range being such that the total amount of curing agent used is between 60% and 100% of that theoretically required to completely cure the resin.

4. Method of producing a rigid thermoset foam essentially isotropic from a resin having at least two

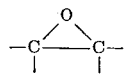

groups per molecule which comprises; exothermally reacting a mixture of said resin and a curing agent, dispersing a finely divided blowing agent in the mixture with the reaction temperature below the active decomposition temperature of said blowing agent, said blowing agent being selected from the group consisting of ammonium bicarbonate, ammonium carbonate and mixtures of ammonium bicarbonate and ammonium carbonate, said blowing agent being the sole blowing agent present, with said blowing agent present in the mixture, thereafter conducting the reaction below said active decomposition temperature, and thereafter with the reaction below said decomposition temperature, triggering the exothermally reacting mixture, with the latter at a temperature of approximately 95° C. and prior to substantial thermal decomposition of the blowing agent by adding a quantity of diethylene triamine, in an amount from 2% to 6% of that theoretically required for complete cure of the resin, and immediately pouring the mixture into a mold and closing the mold, whereby the exothermic curing and foaming reaction is completed in the mold in the absence of air and under an internally generated pressure of 5 to 50 p.s.i., the quantities selected within the above percentage ranges being such that the total amount of curing agent used is between 60% and 110% of that theoretically required to completely cure the resin.

5. The method of producing a rigid thermoset foam, having a given density in the range 2 lbs. per cubic foot to 40 lbs. per cubic foot, the cellular structure of the foam being such that the foam is isotropic as to the given density, from a resin having two or more epoxide groups per molecule which comprises introducing into a quantity of said resin a polyethylene amine, to partially cure the resin, in an amount equal to 5% to 25% of that theoretically necessary to completely cure that quantity of said resin, thereafter adding a blowing agent selected from the group consisting of ammonium bicarbonate, ammonium carbonate and mixtures of ammonium bicarbonate and ammonium carbonate, of a particle size to pass a 200 mesh screen (U.S. Standard Sieve No. 200) and be retained on a 350 mesh screen (U.S. Standard Sieve No. 350), said agent being dispersed in a surface active agent, thereafter adding an amine curing agent for the resin selected from the group consisting of metaphenylene diamine, p,p'-methylene dianiline, and mixtures of metaphenylene diamine and p,p'-methylene dianiline in an amount equal to 50% to 90% of that theoretically necessary to completely cure that quantity of said resin, and thereafter mixing into the exothermally reacting mixture, with the latter at a temperature approximating 95° C., a quantity of diethylene triamine, in an amount from 2% to 6% of that theoretically required for complete cure of the resin, to trigger and promote a rapid, uniform decomposition of the blowing agent, and immediately pouring the mixture into a mold and closing the mold, whereby the exothermic curing and foaming reaction is completed in the mold in the absence of air and under an internally generated pressure of 5 to 50 p.s.i., the quantities selected within the above percentage ranges being such that the total amount of curing agent used is between 60% and 110% of that theoretically required to cure the resin.

6. The method as recited in claim 5 in which the polyethylene amine is diethylene triamine.

7. The method as recited in claim 5 in which the polyethylene amine is approximately 10% of that theoretically necessary to completely cure the resin.

8. The method as recited in claim 5, in which the blowing agent is added in an amount to produce a volume of $CO_2$ and $NH_3$ gas at least 50% greater than the volume of the mold cavity.

9. The method as recited in claim 5, in which the resin is the reaction product of Bisphenol A with epichlorohydrin having an epoxide equivalent weight in the range 175–375.

10. The method as recited in claim 9 in which the polyethylene amine is diethylene triamine.

11. The method as recited in claim 9 in which the polyethylene amine is approximately 10% of that theoretically necessary to completely cure the resin.

12. The method as recited in claim 9 in which the blowing agent is ammonium bicarbonate and is added in an amount to produce a volume of $CO_2$ and $NH_3$ gas at least 50% greater than the volume of the mold cavity.

13. Method of producing a rigid thermoset foam from a resin having at least two

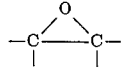

groups per molecule which comprises reacting a mixture of said resin and a curing agent to partially cure said resin, cooling said mixture, dispersing therein a finely divided decomposable blowing agent while maintaining said mixture below the decomposition temperature of said blowing agent, said blowing agent being the sole blowing agent present in the mixture, adding thereto a material selected from the group consisting of primary and secondary aliphatic polyamines, and immediately confining the mixture, whereby the cure of the resin is completed and the active foaming reaction takes place under an internally generated pressure.

References Cited by the Examiner

UNITED STATES PATENTS

| | | | |
|---|---|---|---|
| 2,643,239 | 6/1953 | Shokal | 260—42 |
| 2,690,987 | 10/1954 | Jeffries et al. | 18—59 |
| 2,739,134 | 3/1956 | Parry et al. | 260—2.5 |
| 2,831,820 | 4/1958 | Aase et al. | 260—2.5 |

MURRAY TILLMAN, *Primary Examiner.*

DANIEL ARNOLD, LEON J. BERCOVITZ, *Examiners.*

MORTON FOELAK, *Assistant Examiner.*